(12) United States Patent
Oh et al.

(10) Patent No.: US 10,327,030 B2
(45) Date of Patent: Jun. 18, 2019

(54) DISPLAY DEVICE AND OPERATING METHOD THEREOF

(71) Applicant: LG ELECTRONICS INC., Seoul (KR)

(72) Inventors: Hyojung Oh, Seoul (KR); Seunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 15/253,272

(22) Filed: Aug. 31, 2016

(65) Prior Publication Data
US 2017/0201790 A1    Jul. 13, 2017

(30) Foreign Application Priority Data
Jan. 8, 2016  (KR) ........................ 10-2016-0002717

(51) Int. Cl.
| | |
|---|---|
| *H04N 7/10* | (2006.01) |
| *H04N 7/025* | (2006.01) |
| *H04N 21/431* | (2011.01) |
| *H04W 68/00* | (2009.01) |
| *H04N 21/643* | (2011.01) |
| *H04N 21/414* | (2011.01) |
| *H04N 21/422* | (2011.01) |
| *H04N 21/439* | (2011.01) |
| *H04N 21/488* | (2011.01) |
| *H04N 21/472* | (2011.01) |
| *G06F 3/14* | (2006.01) |

(Continued)

(52) U.S. Cl.
CPC ....... *H04N 21/4316* (2013.01); *G06F 3/1454* (2013.01); *H04N 21/4122* (2013.01); *H04N 21/4126* (2013.01); *H04N 21/41407* (2013.01); *H04N 21/42204* (2013.01); *H04N 21/439* (2013.01); *H04N 21/4788* (2013.01); *H04N 21/47217* (2013.01); *H04N 21/4882* (2013.01); *H04N 21/64322* (2013.01); *H04W 68/005* (2013.01); *G09G 2370/02* (2013.01); *G09G 2370/16* (2013.01)

(58) Field of Classification Search
CPC .................... H04N 21/42204; H04N 21/4882
See application file for complete search history.

(56) References Cited

U.S. PATENT DOCUMENTS

| | | | |
|---|---|---|---|
| 8,819,268 B1 | 8/2014 | Sauer | |
| 2008/0134278 A1* | 6/2008 | Al-Karmi | ..................... 725/141 |

(Continued)

FOREIGN PATENT DOCUMENTS

| | | | |
|---|---|---|---|
| EP | 2 242 240 A1 | 10/2010 | |
| EP | 2 669 788 A1 | 12/2013 | |

*Primary Examiner* — Gigi L Dubasky
(74) *Attorney, Agent, or Firm* — Birch, Stewart, Kolasch & Birch, LLP

(57) ABSTRACT

A display device includes: a wireless communication unit configured to communicate to perform a screen mirroring function with a mobile terminal; a display unit configured to display a screen of the mobile terminal through the screen mirroring function; and a control unit configured to control the wireless communication unit and the display unit. If the mobile terminal receives a notification, while displaying a media content being played by the mobile terminal, the control unit displays a notification icon for representing that the notification is received.

14 Claims, 22 Drawing Sheets

(51) Int. Cl.
*H04N 21/41* (2011.01)
*H04N 21/4788* (2011.01)

(56) References Cited

U.S. PATENT DOCUMENTS

2010/0259464 A1* 10/2010 Chang et al. .................. 345/2.3
2014/0317543 A1* 10/2014 Kim .................... G06F 3/04817
                                                           715/765

* cited by examiner

DISPLAY DEVICE AND OPERATING METHOD THEREOF

CROSS-REFERENCE TO RELATED APPLICATIONS

The present application claims priority under 35 U.S.C. 119 and 35 U.S.C. 365 to Korean Patent Application No. 10-2016-0002717 (filed on Jan. 8, 2016), which is hereby incorporated by reference in its entirety.

BACKGROUND

The present disclosure relates to a display device and an operating method thereof, and particularly, to controlling a notification that a mobile terminal receives during the performance of a screen mirroring function.

Digital TV services using wired or wireless communication networks are becoming common. The digital TV services can provide various services that conventional analog broadcasting services cannot provide.

For example, Internet Protocol Television (IPTV) and smart TV services, that is, types of digital TV services, provide interactivity that allows users to actively select the types, watching times, and so on of watching programs. The IPTV and smart TV services can provide various additional services, for example, internet search, home shopping, and online game, based on such interactivity.

Additionally, recently, information outputted from a terminal connected to a TV can be provided through the screen of the TV. Among them, a screen mirroring function for displaying the screen of a terminal connected to a TV as it is used greatly.

However, conventionally, a display device such as a TV displays the screen of a terminal connected to TV as it is during the performance of the screen mirroring function. Accordingly, if a terminal receives a notification, information on the received notification is displayed on the screen of the display device so that viewing content can be interfered.

Additionally, conventionally, during the performance of the screen mirroring function, a display device displays only a content received from a terminal but cannot control the screen of the display device separately.

SUMMARY

Embodiments provide a display device for controlling a notification that a mobile terminal receives during the performance of a screen mirroring function between a display device and the mobile terminal and an operating method thereof.

Embodiments also provide a display device for preventing a user from being disturbed in viewing a media content due to a notification that a mobile terminal receives during the performance of a screen mirroring function between a display device and the mobile terminal and an operating method thereof.

Embodiments also provide using a notification that a mobile terminal receives during the performance of a screen mirroring function between a display device and the mobile terminal.

In one embodiment, a display device includes: a wireless communication unit configured to communicate to perform a screen mirroring function with a mobile terminal; a display unit configured to display a screen of the mobile terminal through the screen mirroring function; and a control unit configured to control the wireless communication unit and the display unit, wherein if the mobile terminal receives a notification, while displaying a media content being played by the mobile terminal, the control unit displays a notification icon for representing that the notification is received.

If a pointer that moves according to a movement of a remote control device is disposed on the notification icon, the control unit can display preview information of the received notification.

If the preview information is selected, the control unit can display detail information of the received notification or a content corresponding to the received notification.

canIf an instruction for selecting the notification icon is received, detail information of the notification is displayed to be overlapped with the media content according to the received instruction.

The control unit can receive a first instruction for selecting content information included in detail information of the notification and display a content corresponding to the content information on a screen of the display unit according to the received first instruction.

The control unit can transmit a second instruction for displaying the content to the mobile terminal according to the first instruction.

The control unit can not receive the media content from the mobile terminal according to the first instruction.

The control unit can display the media content and the content on a divided screen according to the first instruction.

If the notification is a call from the other party, the control unit can stop the playback of the media content according to an instruction for selecting the notification icon; and the control unit can output a voice of the call through an audio output unit included in the display device.

If the mobile terminal receives the notification, while displaying a home screen of the mobile terminal, the control unit can display notification information corresponding to the notification.

In another embodiment, an operating method of a display device includes: receiving information on a screen being displayed by a mobile terminal through a screen mirroring function; displaying a media content being played by the mobile terminal on the basis of the received information; and if the mobile terminal receives a notification, while displaying the media content, displaying a notification icon for representing that the notification is received.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can b used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
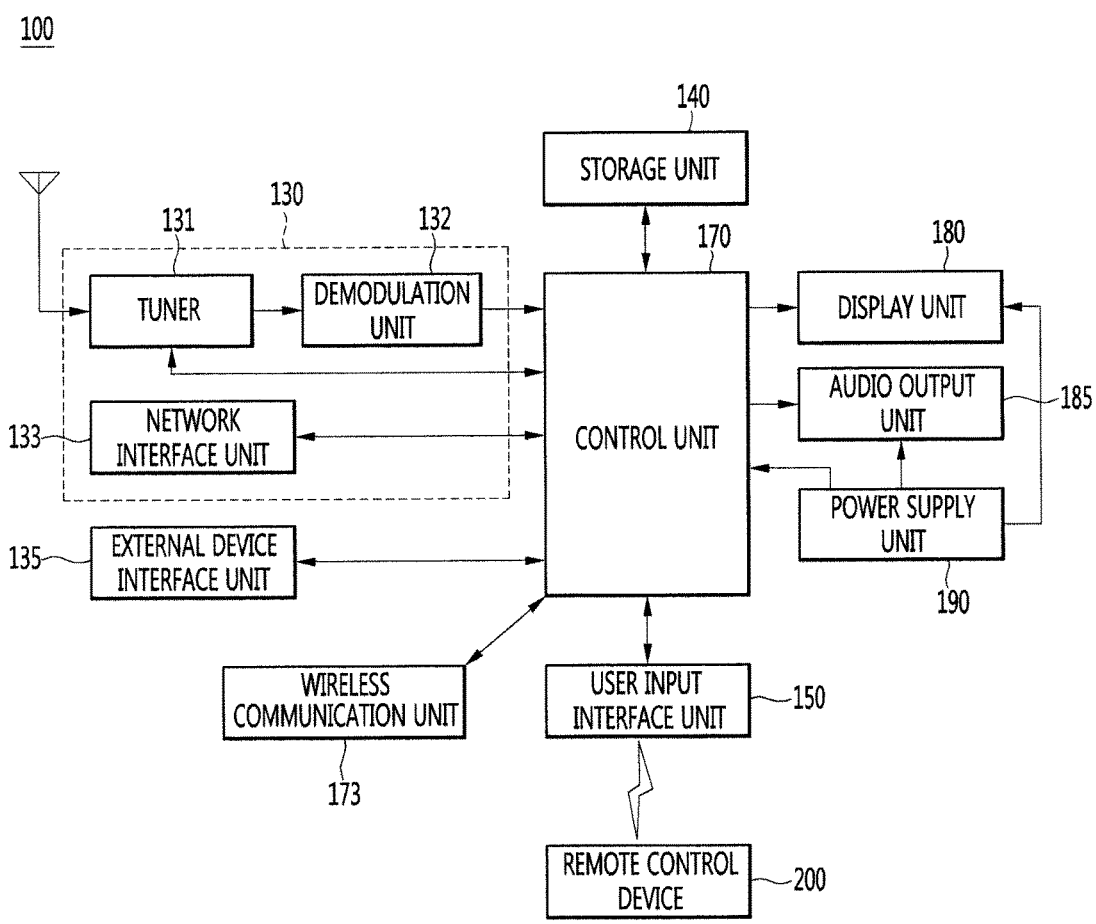
FIG. 1 is a block diagram illustrating a configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 590.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be outputted through the display unit 180. A sound signal of an external device inputted through the external device interface unit 135 can be outputted through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
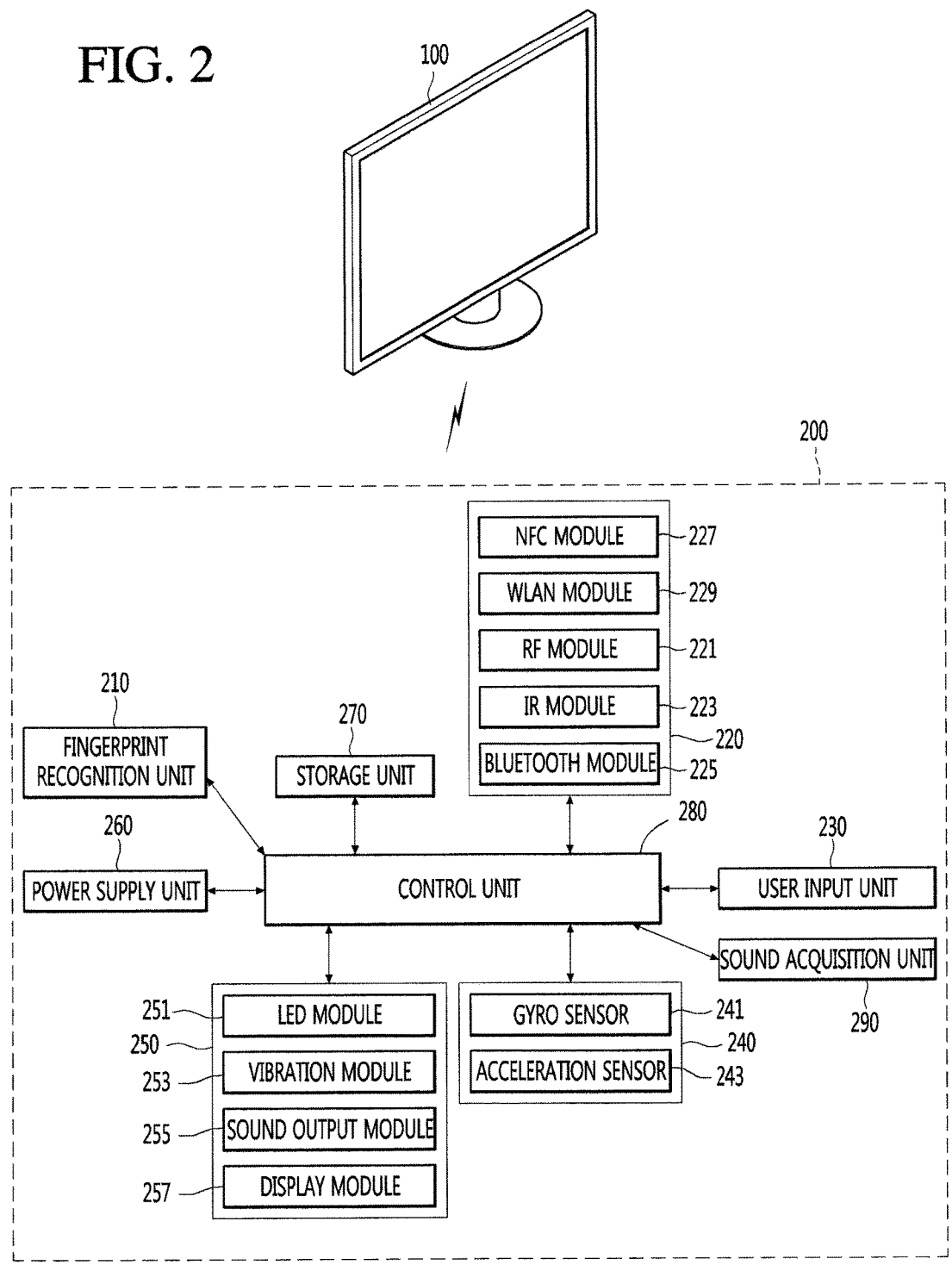
FIG. 2 is a block diagram illustrating a remote control device according to an embodiment of the present invention.
Figure 3:
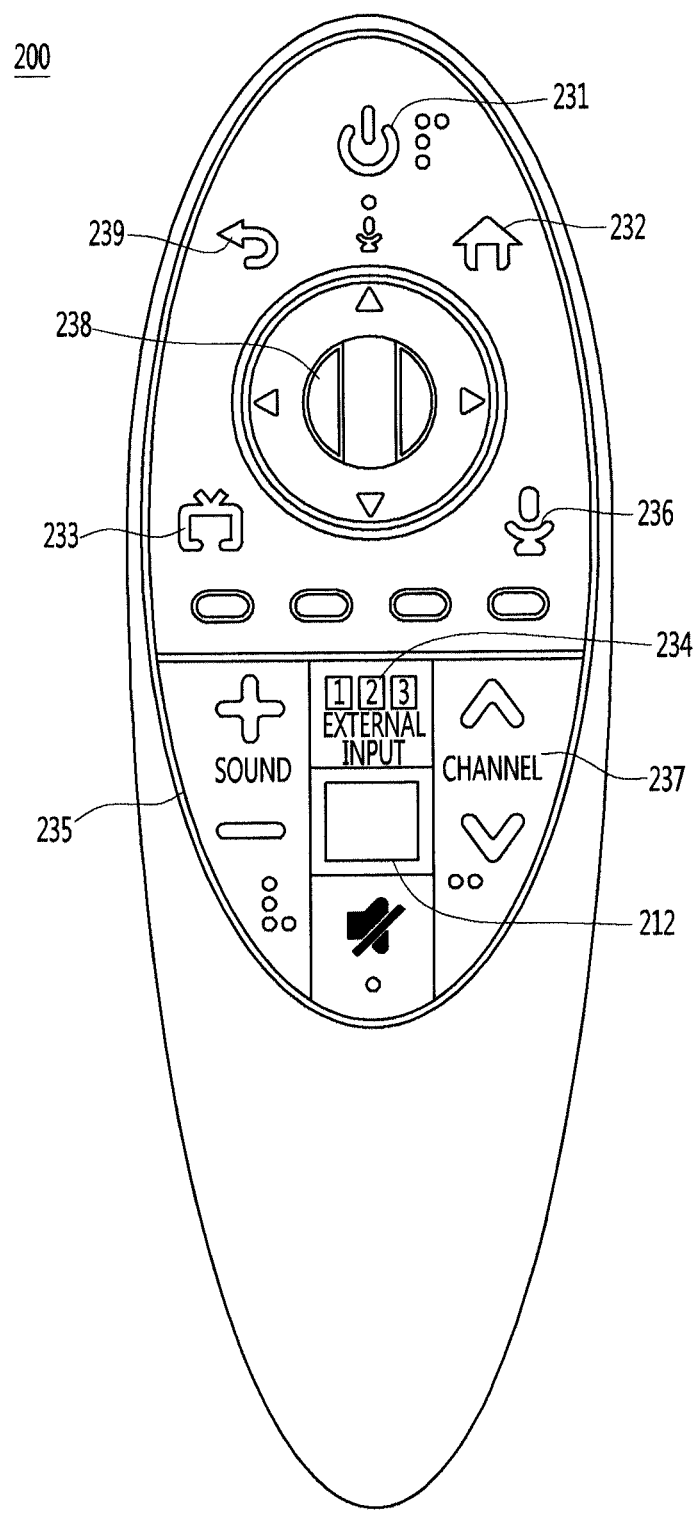
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
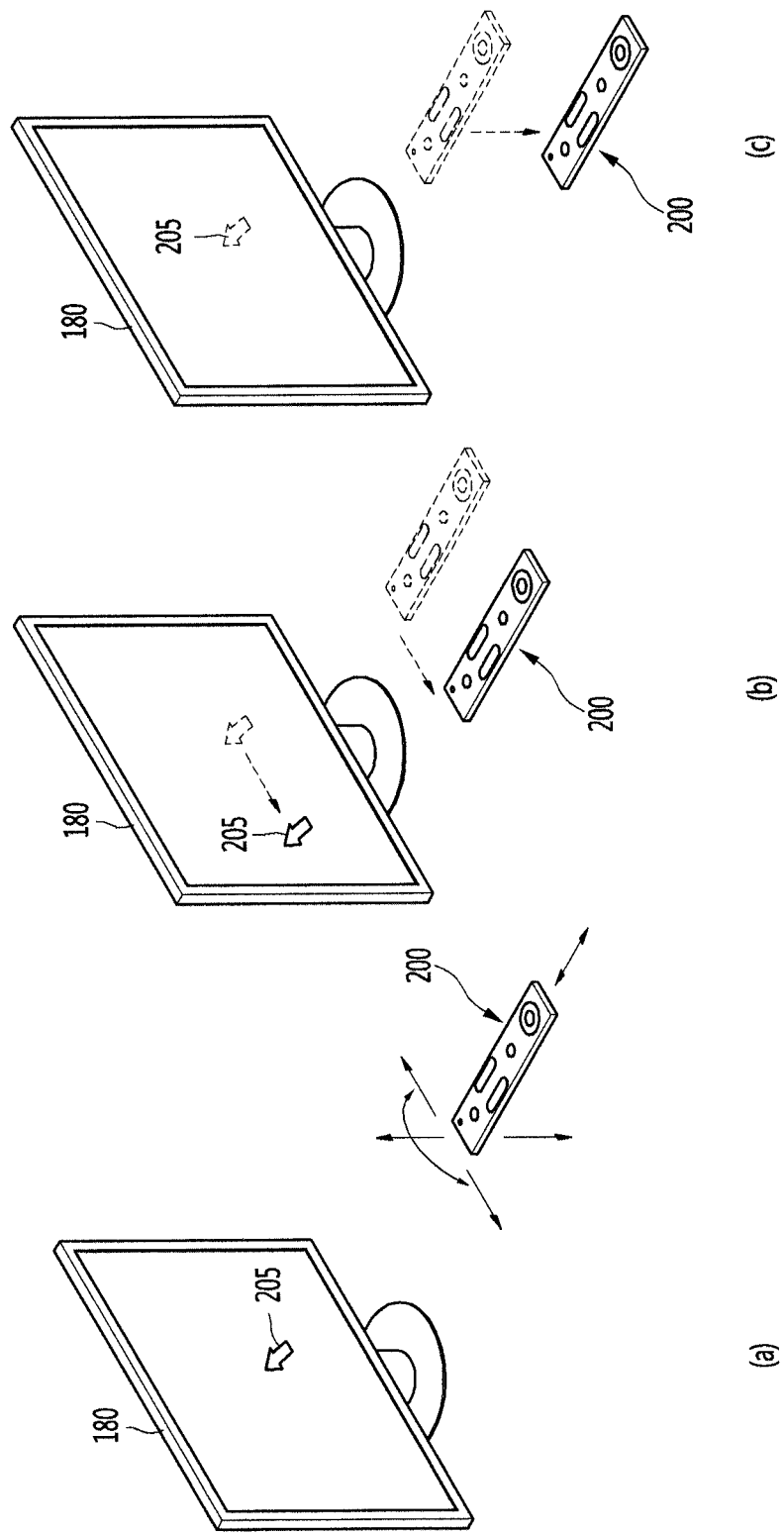
FIG. 4 is a view of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely. On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Then, a configuration of a mobile terminal according to an embodiment of the present invention will be described with reference to FIG. 5.

Then, an operating method of a system according to an embodiment of the present invention will be described with reference to FIG. 5.

Figure 5:
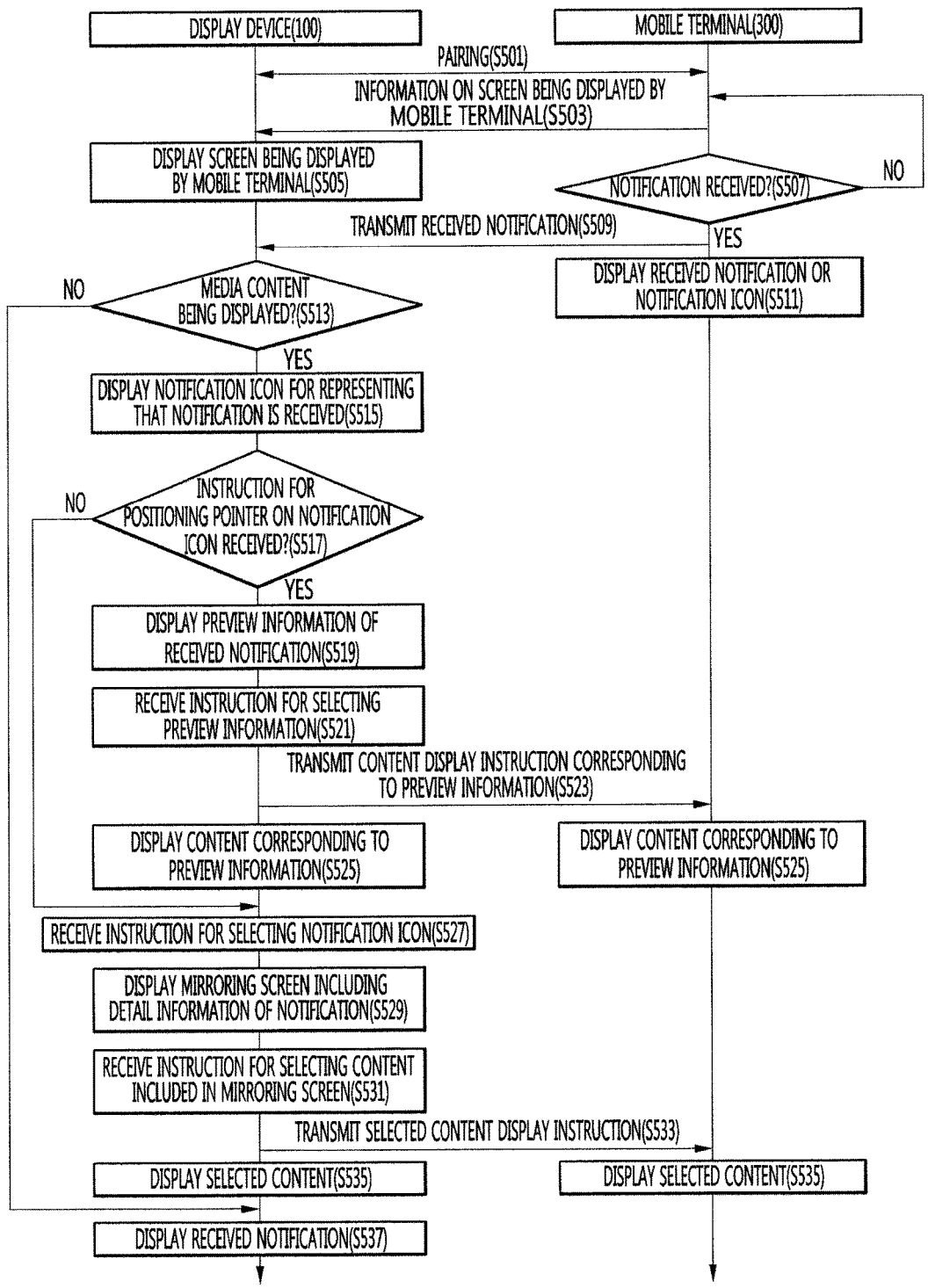
FIG. 5 is a ladder diagram illustrating an operating method of a system according to an embodiment of the present invention.

FIG. 5 is a ladder diagram illustrating an operating method of a system according to an embodiment of the present invention.

Referring to FIG. 5, the display device 100 and the mobile terminal 300 are paired to each other to perform a screen mirroring function in operation S501. The screen mirroring function can be a function for displaying a screen being displayed by one device identically.

The control unit 170 of the display device 100 receives information on a screen being displayed by the mobile terminal 300 through the wireless communication unit 173 in operation S503, and displays the screen being displayed by the mobile terminal 300 through the display unit 180 on the basis of the received information in operation S505.

According to an embodiment, the screen being displayed by the mobile terminal 300 can be a playback screen of media content, which plays the media content.

According to another embodiment, the screen being displayed by the mobile terminal 300 can be a home screen where media content is not being played.

This will be described with reference to FIG. 6.

Figure 6:
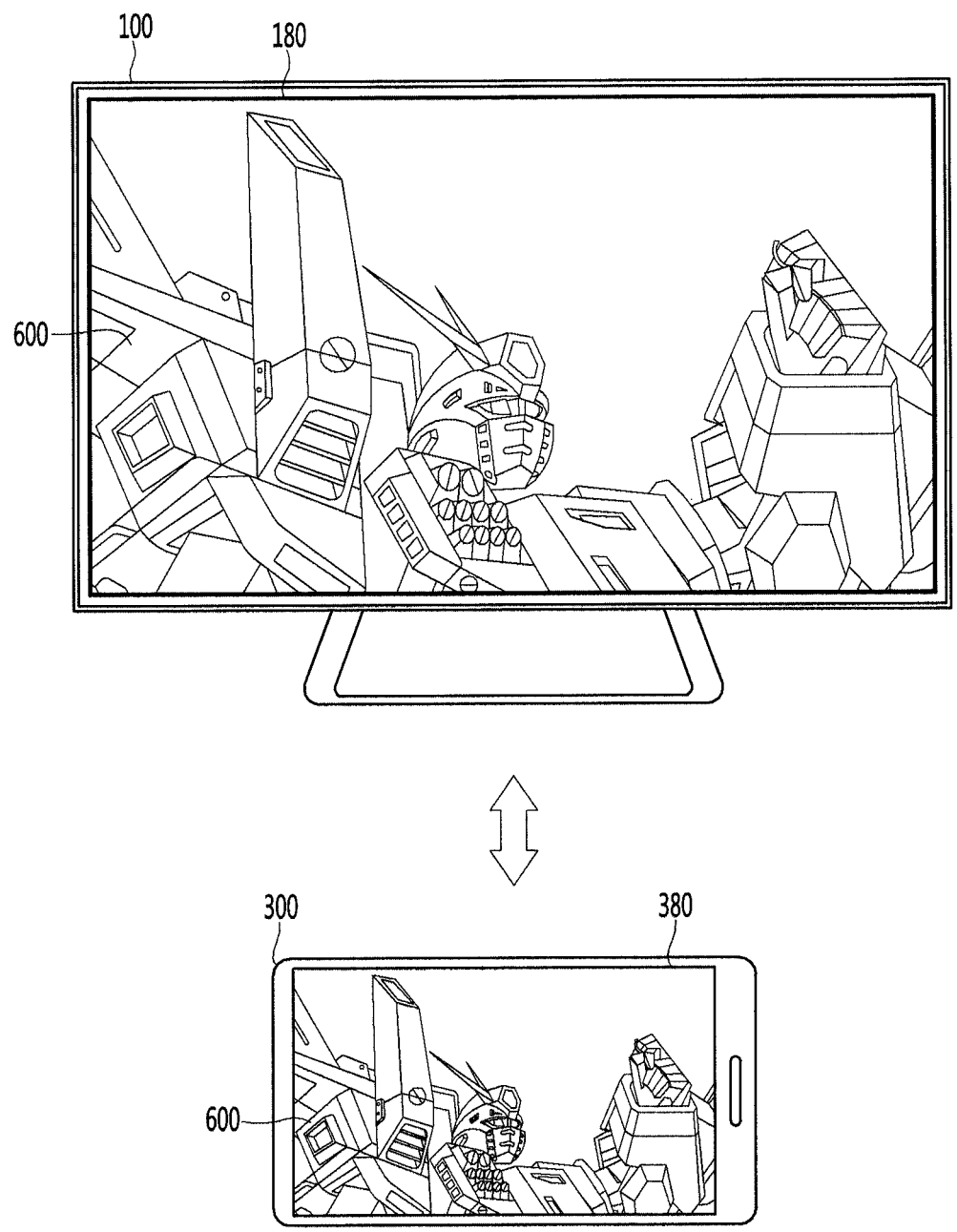
FIG. 6 is a view that a display device and a mobile terminal perform a screen mirroring function currently according to an embodiment of the present invention.

FIG. 6 is a view that a display device and a mobile terminal perform a screen mirroring function currently according to an embodiment of the present invention.

Referring to FIG. 6, the control unit 170 of the display device 100 currently displays (or play) a media content 600 through the display unit 180. The media content 600 is being displayed (or played) through the display unit 380 of the mobile terminal 300 connected to the display device 100.

A user can view the media content through the display device 100 having a larger screen than the mobile terminal 300 by using a screen mirroring function.

Again, FIG. 5 is described.

The control unit (not shown) of the mobile terminal 300 checks whether a notification is received from the outside in operation S507 and if the notification is received, transmits the received notification to the display device 100 in operation S509. According to an embodiment, the notification can be notification that the mobile terminal 300 receives from another mobile terminal or a server. The notification can include information for representing that contents such as video, image, audio, and text are received from the outside. As another example, the notification can include video and text.

Moreover, the control unit of the mobile terminal 300 displays a received notification or a notification icon for representing a notification is received through a display unit (not shown).

After receiving a notification from the mobile terminal 300, the control unit 170 of the display device 100 checks whether a media content is in playback in operation S513. That is, the control unit 170 can check whether a screen being displayed by the mobile terminal 300 is a playback screen of media content through a screen mirroring function.

If the media content is being played through a screen mirroring function, the control unit 170 displays a notification icon for representing the notification is received through the display unit 180 in operation S515. That is, since the display device 100 currently displays the media content through the display unit 180, it can display a notification icon in an area of the display unit 180 in order to prevent the interference of user's media content viewing.

According to an embodiment, the notification icon can be an application icon corresponding to an application that provides a notification. Although it is described using a notification icon as an example in this embodiment, the present invention is not limited thereto, and information can be displayed in various forms such as a text and an indicator, which represent that the mobile terminal 300 receives a notification.

If an instruction for positioning the pointer 205 on the notification icon is received in operation S517, the control unit 170 of the display device 100 displays preview information of the received notification through the display unit 180 in operation S519. According to an embodiment, preview information of a notification can include brief information on a received notification. For example, in the case of a video reception notification for representing that video is received, preview information can be a thumbnail image of video. As another example, in the case of an image reception notification for representing that an image is received, preview information can be an image in a reduced state.

Preview information of a notification can be displayed on a notification icon or an area where a notification icon is located.

Preview information on a notification can be displayed to be overlapped with a media content in playback.

If the pointer 205 is disposed on a notification icon, the control unit 170 can request and receive preview information of a notification from the mobile terminal 300.

The control unit 170 of the display device 100 receives an instruction for selecting preview information in operation S521, and transmits a display instruction for displaying a content corresponding to preview information selected according to the received instruction, to the mobile terminal 300 through the wireless communication unit 173 in operation S523. According to an embodiment, the control unit 170 can receive an instruction for selecting preview information through the pointer 205 operable through the remote control device 200.

As receiving an instruction for selecting preview information, the control unit 170 can request a content corresponding to the preview information from the mobile terminal 300, and receive content in response to the request.

Additionally, according to the instruction for selecting preview information, the control unit 170 of the display device 100 displays a content corresponding to the preview information in operation S525, and the mobile terminal 300 displays a content corresponding to the preview information according to the display instruction received from the display device 100 in operation S525.

Operations S513 to S525 will be described with reference to the accompanying drawings.

Figure 7A:
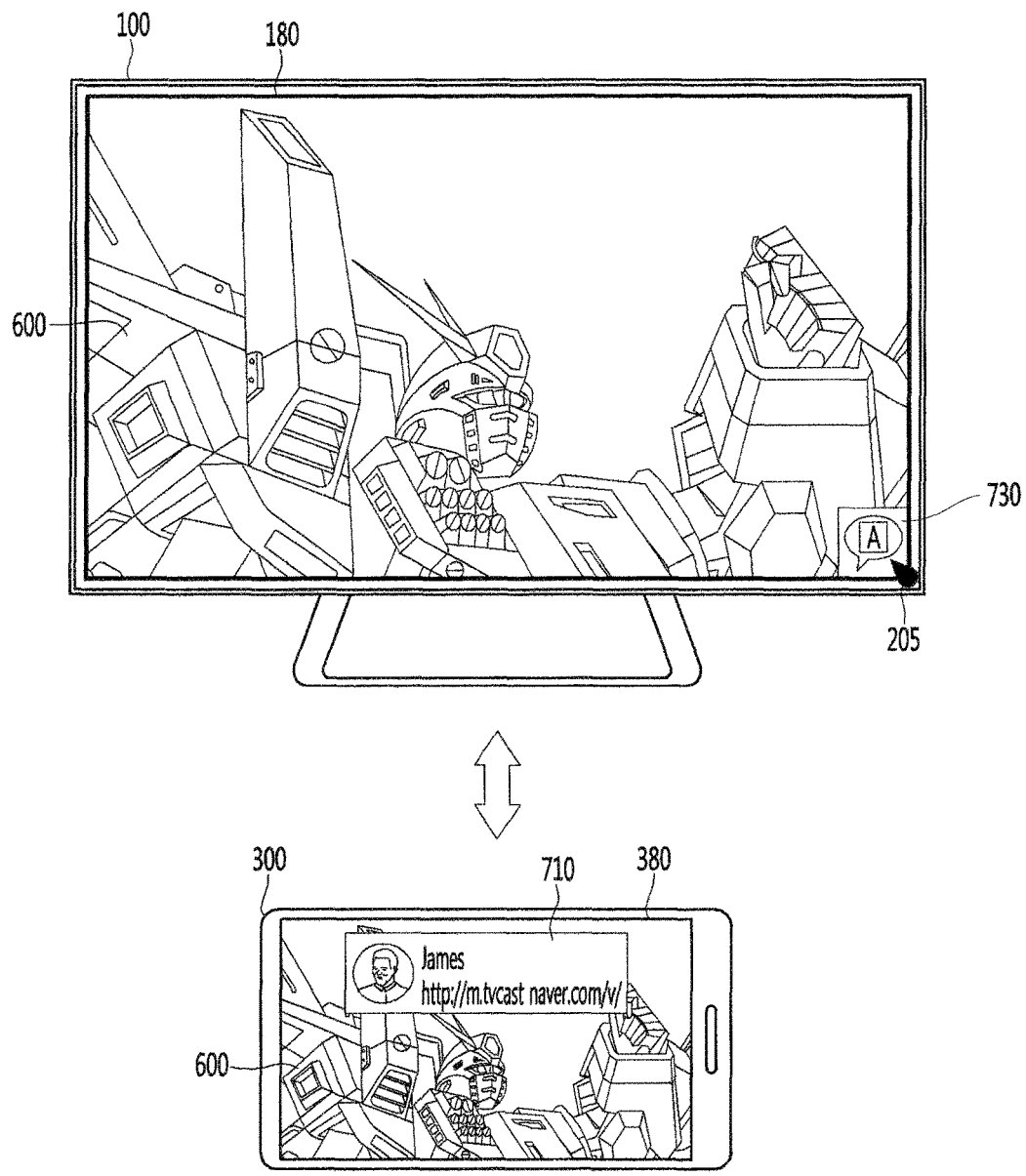
FIGS. 7A to 7C are views illustrating a process for providing a notification icon, preview information of a notification, and a content corresponding to preview information according to an embodiment of the present invention.
Figure 7B:
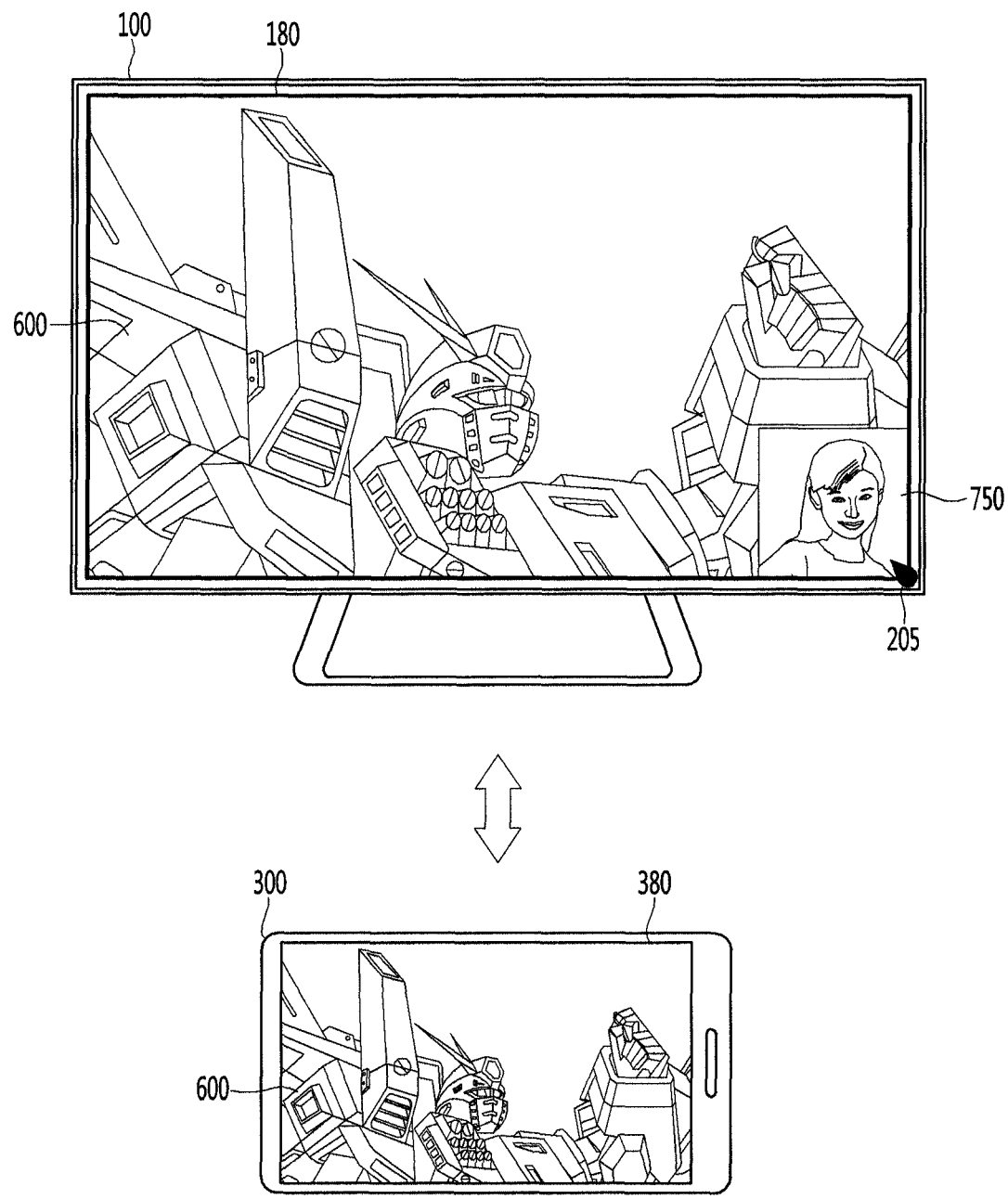
Figure 7C:
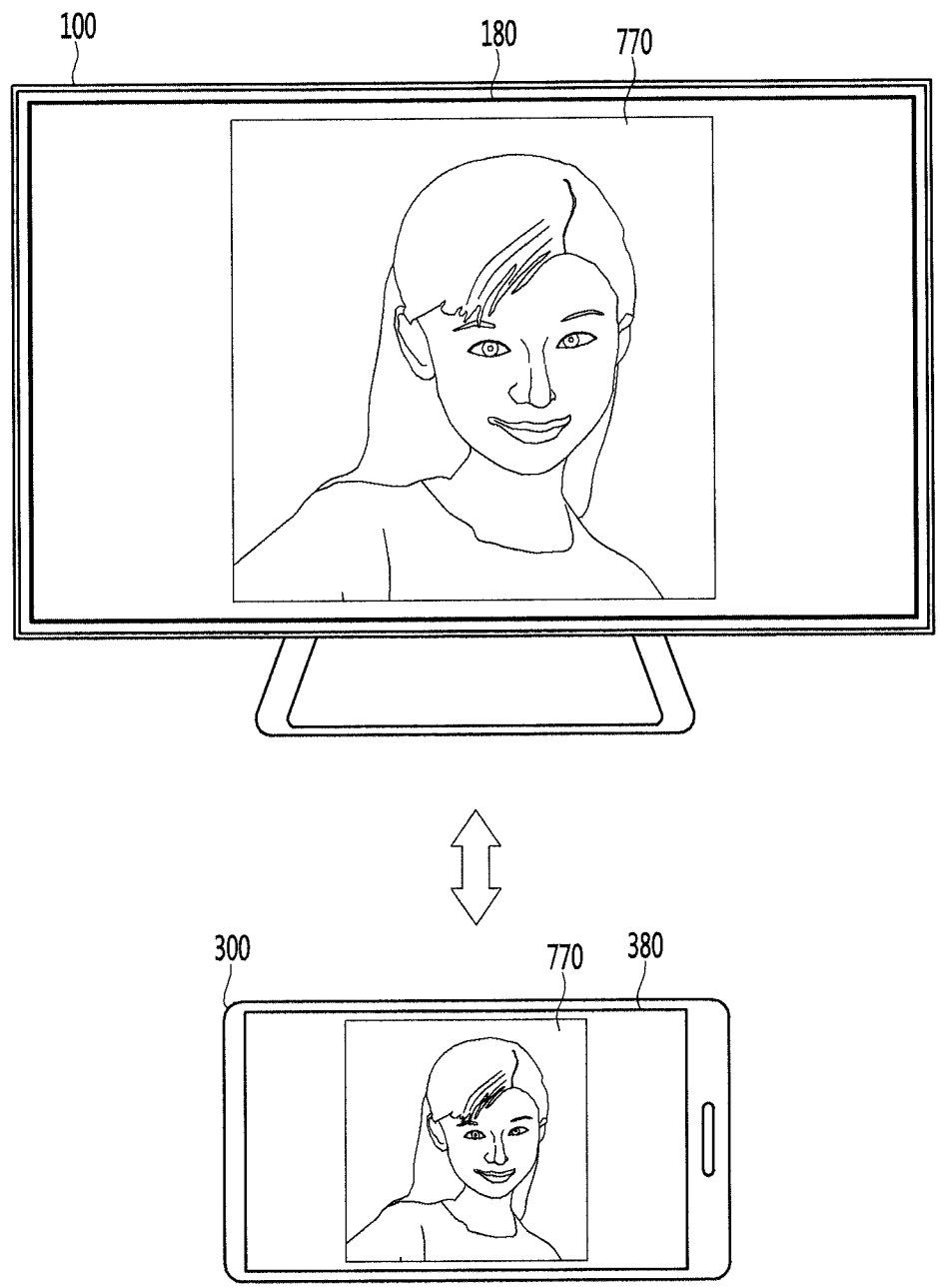

FIGS. 7A to 7C are views illustrating a process for providing a notification icon, preview information of a notification, and a content corresponding to preview information according to an embodiment of the present invention.

Referring to FIG. 6, during the performance of a screen mirroring function between the display device 100 and the mobile terminal 300, the mobile terminal 300 can receive a notification. Referring to FIG. 7, the mobile terminal 300 can display notification information 710 corresponding to the received notification on the media content 600 in playback through the display unit 380. The notification information 710 can include brief information for showing a part of the other party who sends a notification and the notification. During the performance of a screen mirroring function, the display device 100 can be required to display a screen being displayed by the mobile terminal 100 as it is, but due to a received notification, the user's viewing of the media content 600 can be interfered. Accordingly, the control unit 170 of the display device 100 can briefly display information that the mobile terminal 300 receives a notification in order to prevent a user from being disturbed in viewing the media content 600. That is, referring to FIG. 7A, the control unit 170 of the display device 100 can display a notification icon 730 for representing that the mobile terminal 300 receives a notification through the display unit 180. Information that the notification icon 730 displayed by the display device 100 represents and notification information 710 displayed by the mobile terminal 300 can be distinguished from each other. For example, the notification icon 730 can be an application icon corresponding to an application that provides a notification. The notification icon 730 can be displayed on one side of the display unit 180 in order to prevent the viewing of the media content 600 from being disturbed. The notification icon 730 can disappear after being displayed for a predetermined time. The notification icon 730 can disappear after being highlighted for a predetermined time.

Although it is described using an application icon as an example in FIG. 7A, this is just exemplary, and in the case of the minimum information for representing that the mobile terminal 300 receives a notification, it does not matter any form.

Moreover, referring to FIG. 7A, the control unit 170 of the display device 100 can receive, from the remote control device 200, an instruction for positioning the pointer 205 on the notification icon 730. If the pointer 205 is disposed on the notification icon 730 according to the received instruction, as shown in FIG. 7B, the control unit 170 can display the preview information 750 of the notification. The control unit 170 can request the preview information 750 of the notification from the mobile terminal 300 according to the received instruction, and display preview information 750 according to the request.

According to an embodiment, if a notification represents that video or an access address for providing video is received, the preview information 750 of the notification can be a thumbnail image of video. According to another embodiment, if a notification represents that image or an access address for providing image is received, the preview information 750 of the notification can be a reduced image.

Moreover, if the pointer 205 is disposed on the notification icon 730, the mobile terminal 300 can not display the notification information 710 through the display unit 380.

As another embodiment, if the pointer 205 is located on the notification icon 730, the mobile terminal 300 can display detail information including detail content of the notification through the display unit 380.

Moreover, if the preview information 750 is selected through the pointer 205, the control unit 170 of the display unit 100, as shown in FIG. 7C, can display a content 770 corresponding to the preview information 750 on the entire screen of the display unit 180. That is, the control unit 170 can display the content 770 corresponding to the notification on the entire screen without displaying the media content 600 being played through a screen mirroring function. Additionally, if the preview information 750 is selected through the pointer 205, the mobile terminal 300 also can display the content 770 corresponding to the notification or detail information of the notification, on the entire screen through the display unit 180. That is, if the preview information 750 is selected, the content 770 corresponding to the notification or the detail information of the notification are displayed on the display device 100 and the mobile terminal 300, so that a screen mirroring function can be performed.

Again, FIG. 5 is described.

If an instruction for selecting a notification icon is received through the pointer 205 in operation S527, the control unit 170 of the display device 100 displays a mirroring screen including the detail information of the notification through the display unit 180 in operation S529. According to an embodiment, if a notification is selected, a mirroring screen including detail information of a notification can be a screen to be displayed through the display unit 380 of the mobile terminal 300. For example, if the notification information 710 displayed through the display unit 380 of the mobile terminal 300 is selected in FIG. 7A, detail information corresponding to the notification information 710 can be displayed on the entire screen of the mobile terminal 300. The mirroring screen can be a screen for representing a state that corresponding detail information is displayed on the entire screen of the mobile terminal 300.

According to an embodiment, the mirroring screen can be overlaid on the existing media content 600 in playback and displayed.

Detail information of a notification included in a mirroring screen can include content information. The content information can include at least one of an access path (or access address) for providing content, a content thumbnail image, a content name, and content information.

According to an embodiment, as receiving an instruction for selecting a notification icon, the control unit 170 can request a mirroring screen corresponding to a notification from the mobile terminal 300, and receive the mirroring screen from the mobile terminal 300 in response to the request.

The control unit 170 of the display device 100 receives an instruction for selecting content information included in a mirroring screen in operation S531, and displays a content corresponding to content information selected according to the received instruction through the display unit 180 in operation S535. According to an embodiment, the control unit 170 can display the content on the entire screen of the display unit 180.

According to another embodiment, the control unit 170 can display an existing media content in playback and a content corresponding to the selected content information on divided screens.

According to an embodiment, the mirroring screen can be being displayed as a background on the mobile terminal 300.

Additionally, the control unit 170 of the display device 100 transmits a display instruction for displaying a content corresponding to content information selected according to an instruction for selecting content information in a mirroring screen, to the mobile terminal 300 in operation S533. Accordingly, the mobile terminal 300 also displays the content in operation S535.

Operation S527 to S535 will be described with reference to the drawings.

FIGS. 8A to 8E are views of providing a content corresponding to a notification icon in various forms if an icon is selected during the performance notification of a screen mirroring function according to an embodiment of the present invention.

Figure 8A:
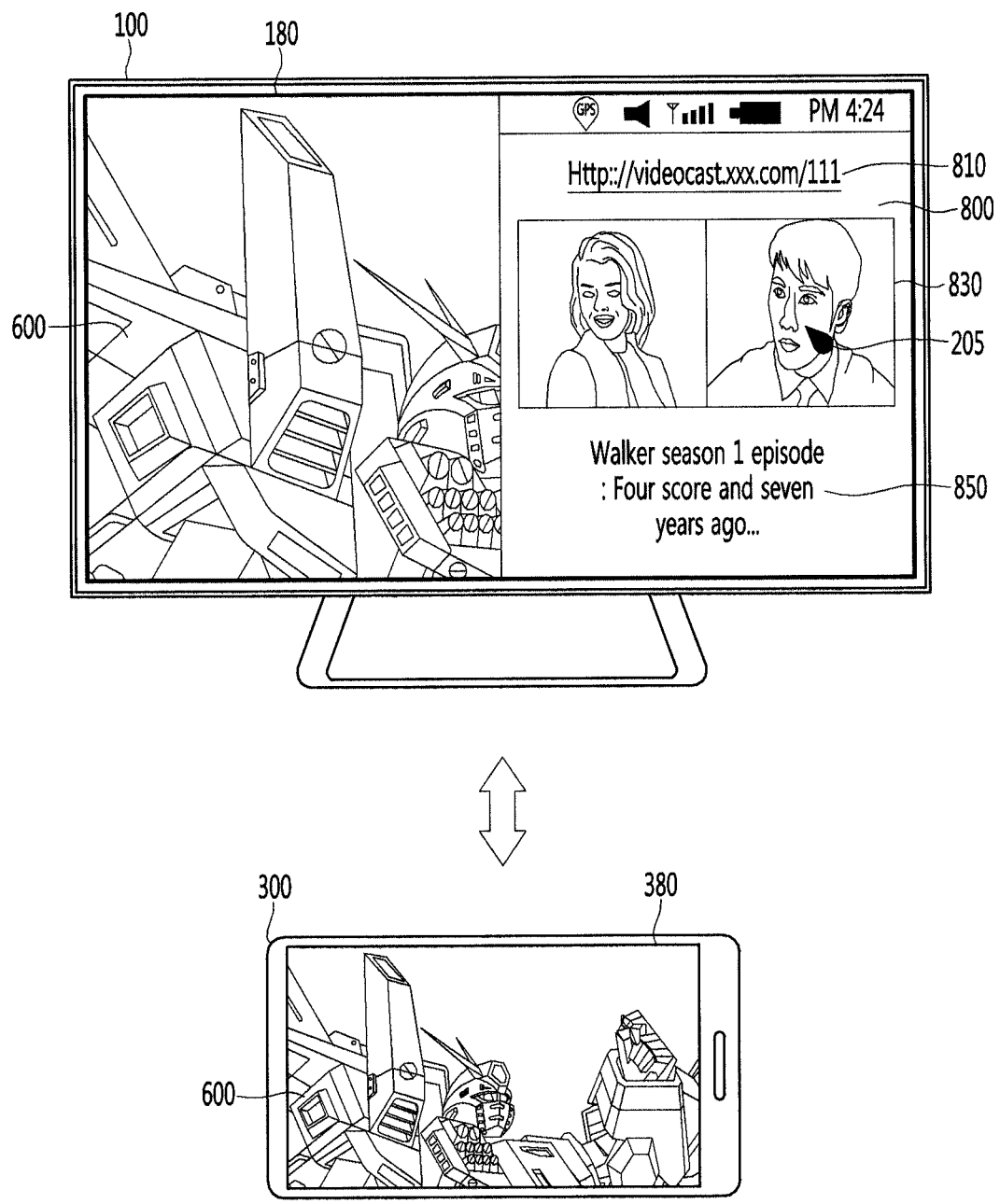
FIGS. 8A to 8E are views of providing a content corresponding to a notification icon in various forms if an icon is selected during the performance notification of a screen mirroring function according to an embodiment of the present invention.

If a notification icon 730 is selected in FIG. 7A, the control unit 170 of the display device 100, as shown in FIG. 8A, can display a mirroring screen 800 including detail information of a notification on the existing media content 600 in playback through the display unit 180. The mirroring screen 800 can include detail information of a notification. The detail information of a notification can include content information. The content information can include at least one of an access path 810 (or access address or URL) for receiving content, a content thumbnail image 830, and content information 850. Moreover, if the notification icon 730 is selected, a control unit (not shown) of the mobile terminal 300 can display only the existing media content 600 in playback. That is, even if the notification icon 730 is selected, the mobile terminal 300 can display the existing media content 600 in playback as it is through a screen mirroring function.

Figure 8B:
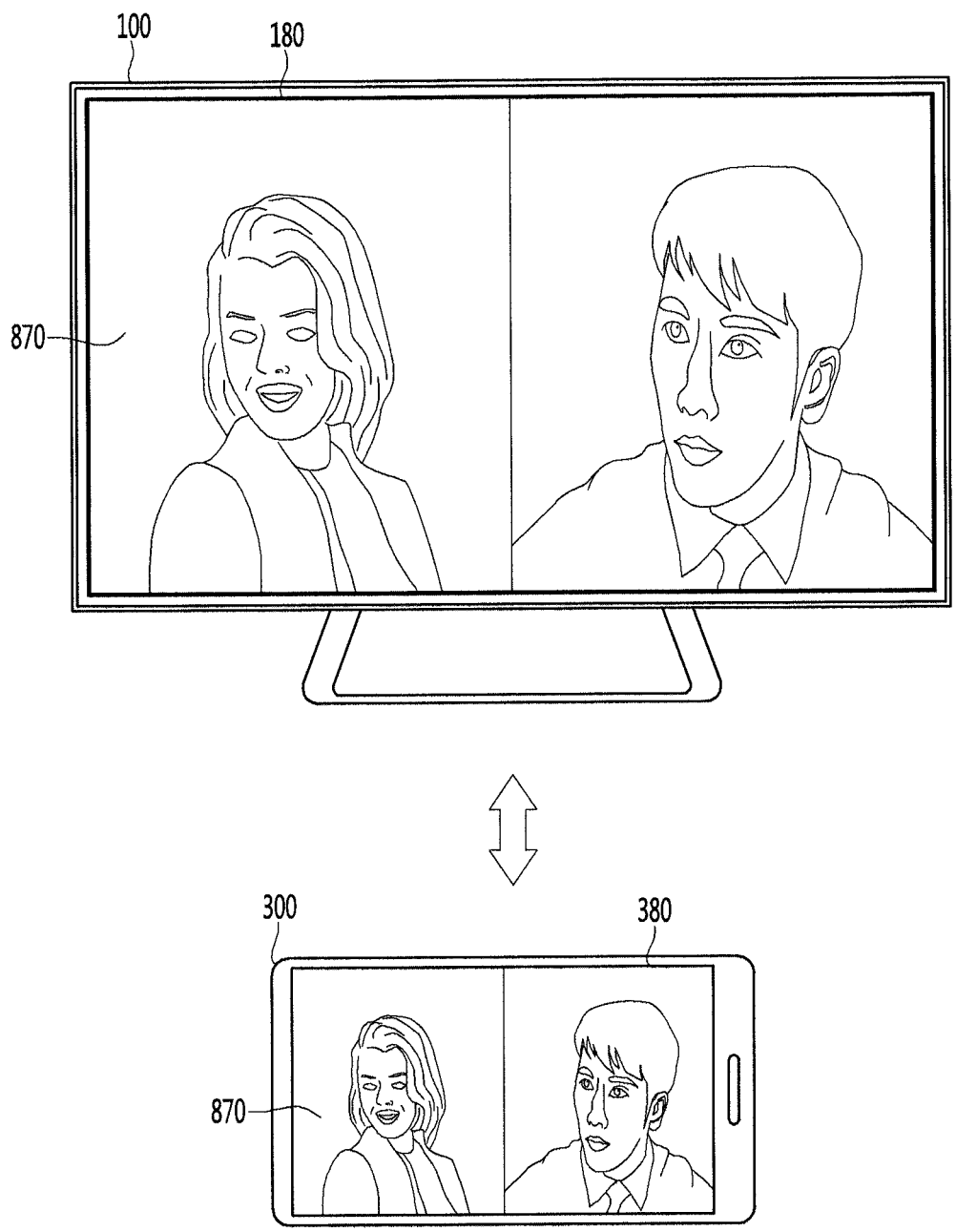

If the access path 810 or the thumbnail image 830 in the content information is selected, the control unit 170 of the display unit 100, as shown in FIG. 8B, can display a content 870 corresponding to the selected content information on the entire screen of the display unit 180. Additionally, simultaneously, the mobile terminal 300 can display a content 870 corresponding to the selected content information on the entire screen of the display unit 380. In more detail, the control unit 170 of the display device 100 can switch the existing media content 600 in playback into the content 870 corresponding to the selected content information as the content information is selected. In the same manner, the control unit of the mobile terminal 300 can switch the existing media content 600 in playback into the content 870 corresponding to the selected content information as the content information is selected. That is, FIG. 8B illustrates that as content information is selected, a screen mirroring function is performed with respect to the selected content 870.

Figure 8C:
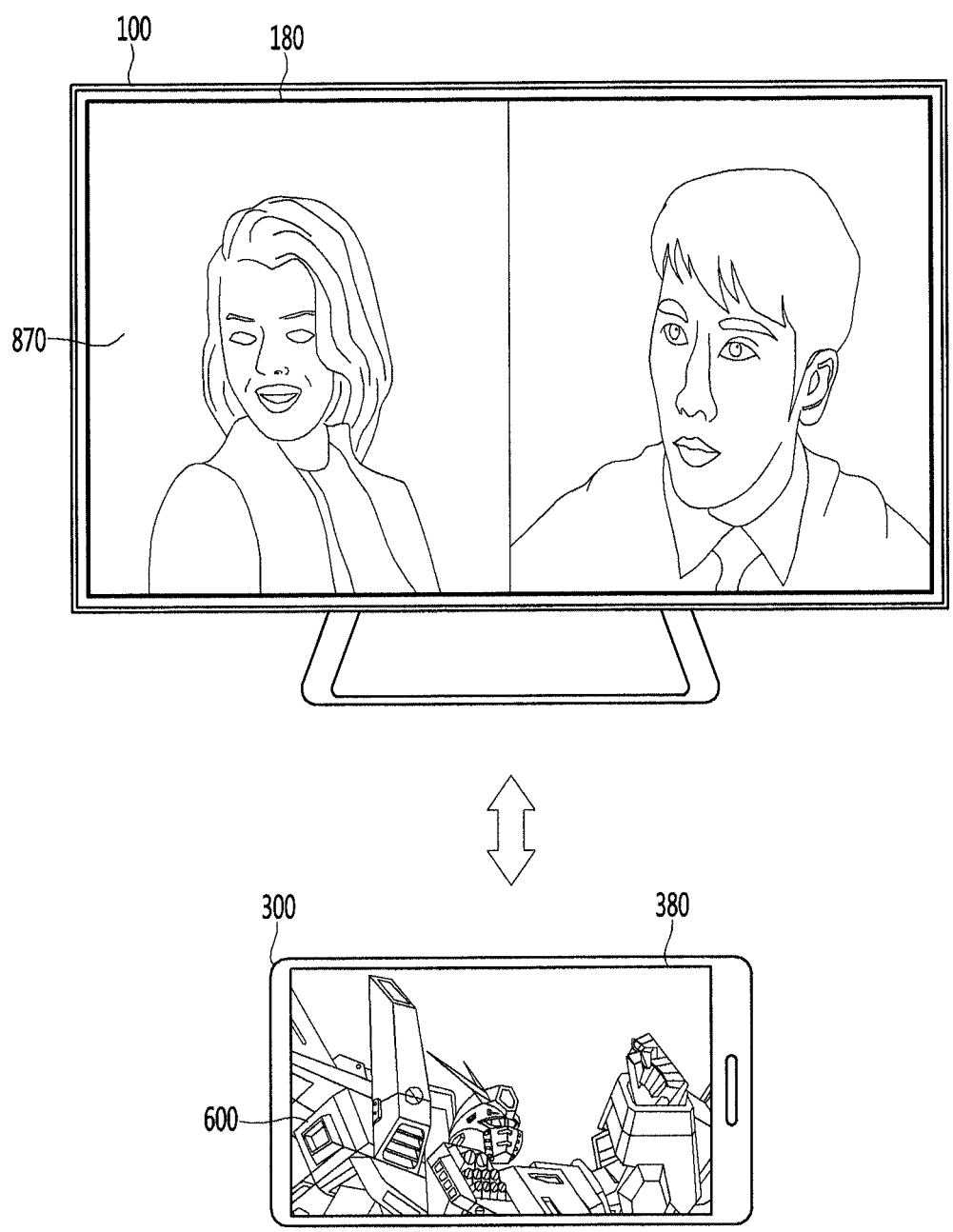

As another example, if content information is selected, only the display device 100 can display a content corresponding to the selected content information. That is, if content information is selected, the control unit 170, as shown in FIG. 8C, can display a content 870 corresponding to the selected content information on the entire screen through the display unit 180. Unlike this, even if content information is selected on the display device 100, the mobile terminal 300 can display the existing media content 600 in playback as it is through the display unit 380. Moreover, referring to FIGS. 8B and 8C, as the display device 100 plays the switched content 870 on the entire screen, the mobile terminal 300 can not transmit the currently played media content 600 to the display device 100. That is, the mobile terminal 300 can stop transmitting the media content 600 to the display device 100. Accordingly, the display device 100 can not receive the media content 600 from the mobile terminal 300.

Figure 8D:
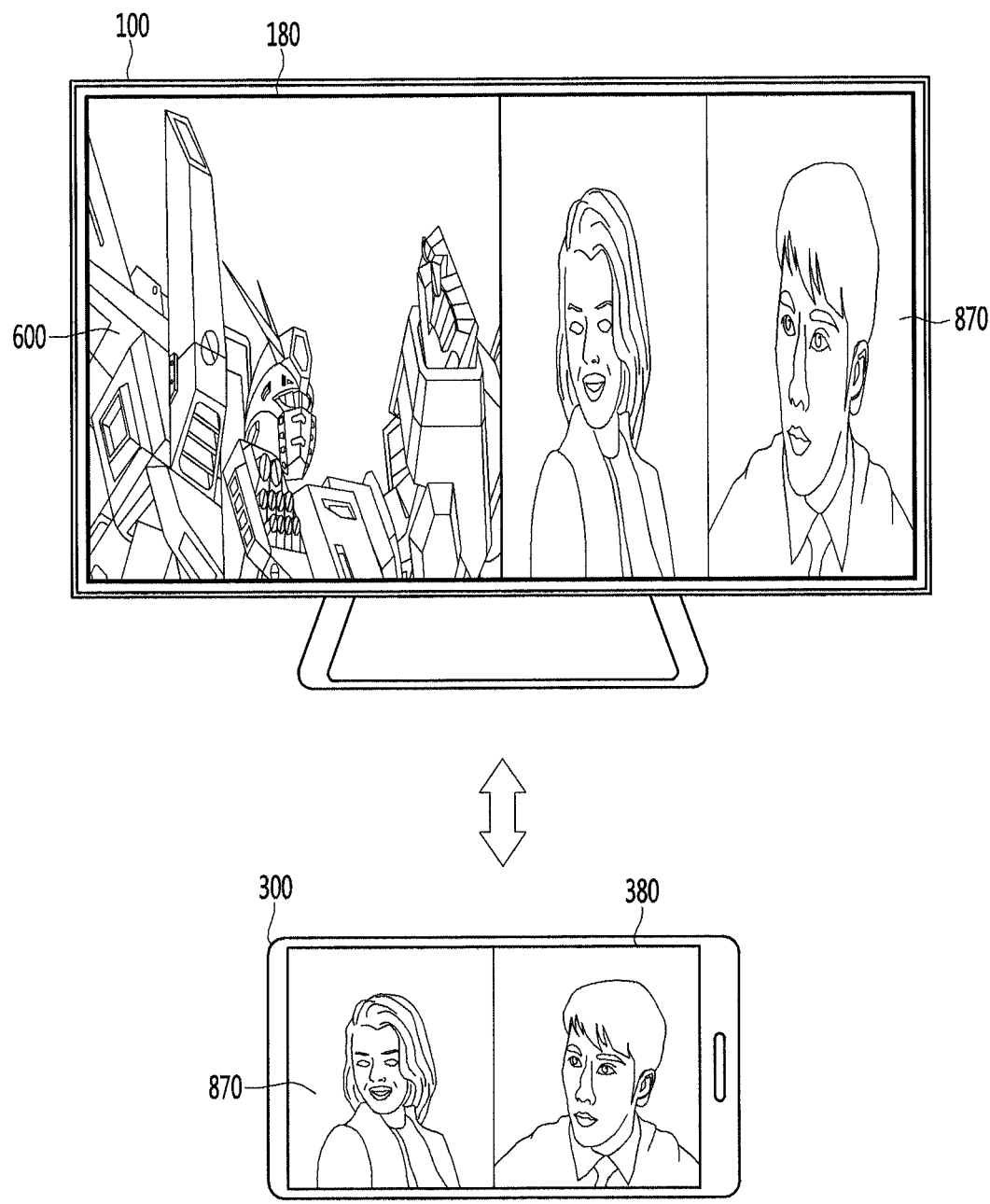

As another example, if content information is selected, the control unit 170 of the display device 100 can display the existing media content 600 in playback and a content corresponding to the selected content information on the divided screens. That is, if content information is selected, the control unit 170, as shown in FIG. 8D, can display the existing media content 600 in playback on the first area of the display unit 180 and the content 870 corresponding to the selected content information on the second area of the display unit 180. Moreover, at this point, the mobile terminal 300 can display the content 870 corresponding to the selected content information on the entire screen of the display unit 380. That is, if content information is selected on the display device 100, the mobile terminal 300 can switch the existing media content 600 in playback to the content 870 corresponding to the selected content information. As another example, even if content information is selected, the mobile terminal 300, as shown in FIG. 8E, can display the existing media content 600 in playback as it is.

Figure 8E:
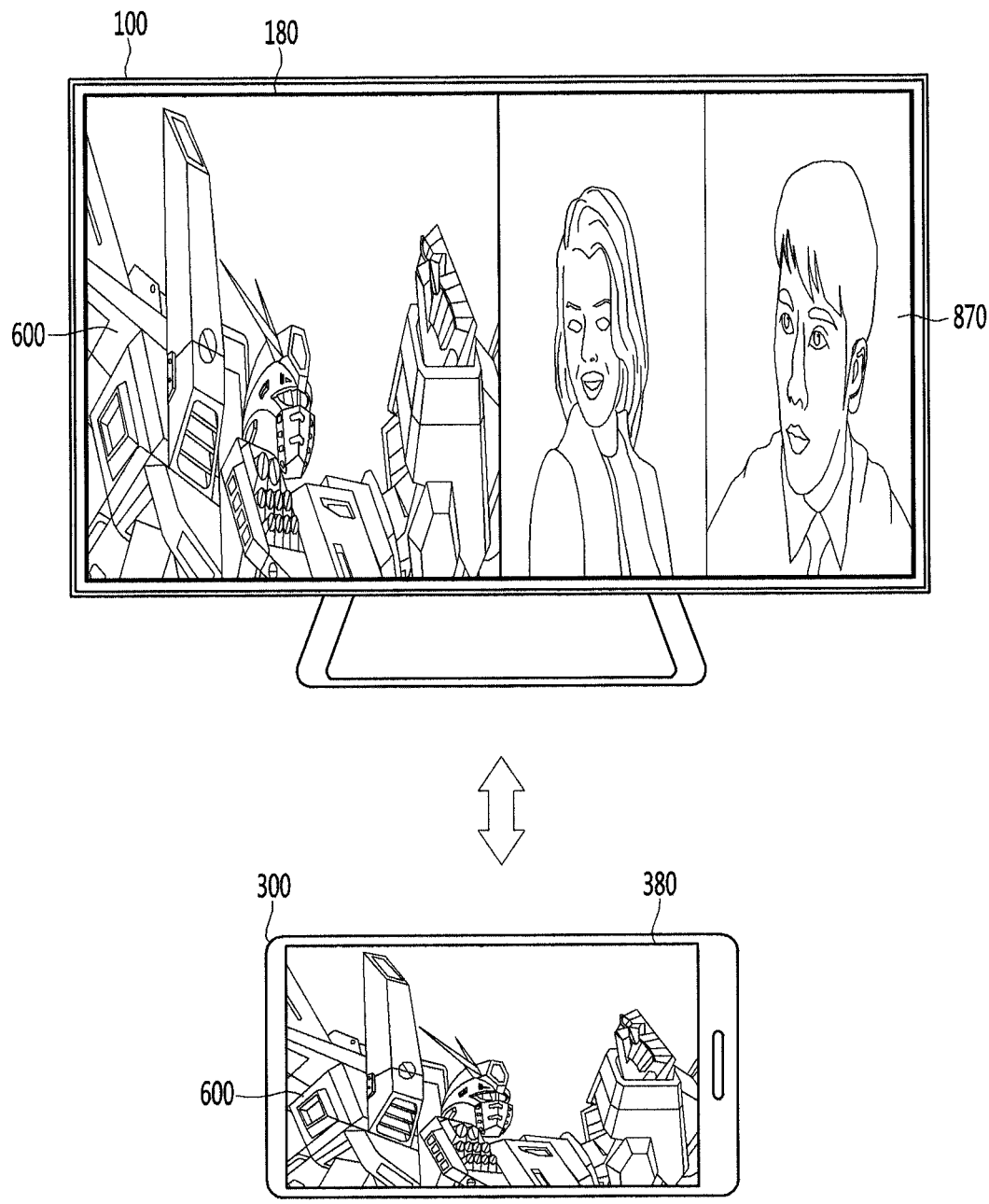

Moreover, referring to FIGS. 8D and 8E, as the display device 100 plays the existing media content 600 and the new content 870 on the divided screens, the mobile terminal 300 can continuously transmit the currently played media content 600 to the display device 100. That is, the mobile terminal 300 can keep transmitting the media content 600 to the display device 100.

According to another embodiment of the present invention, a notification icon can be also displayed on the screen of the mobile terminal 300.

Figure 9A:
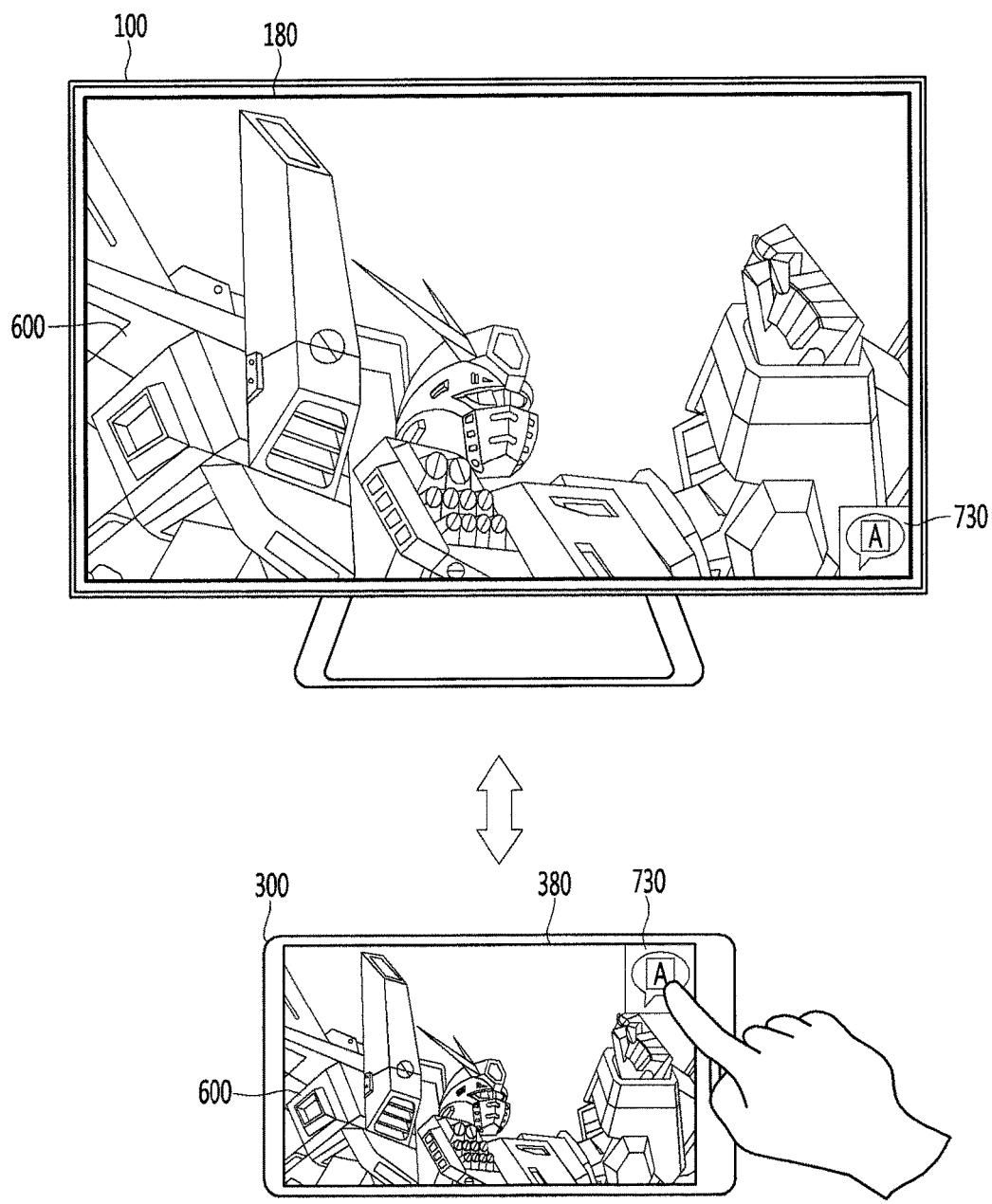
FIGS. 9A to 9C are views of providing information on a notification as a notification icon displayed on the screen of a mobile terminal is selected during the performance of a screen mirroring function according to an embodiment of the present invention.
Figure 9B:
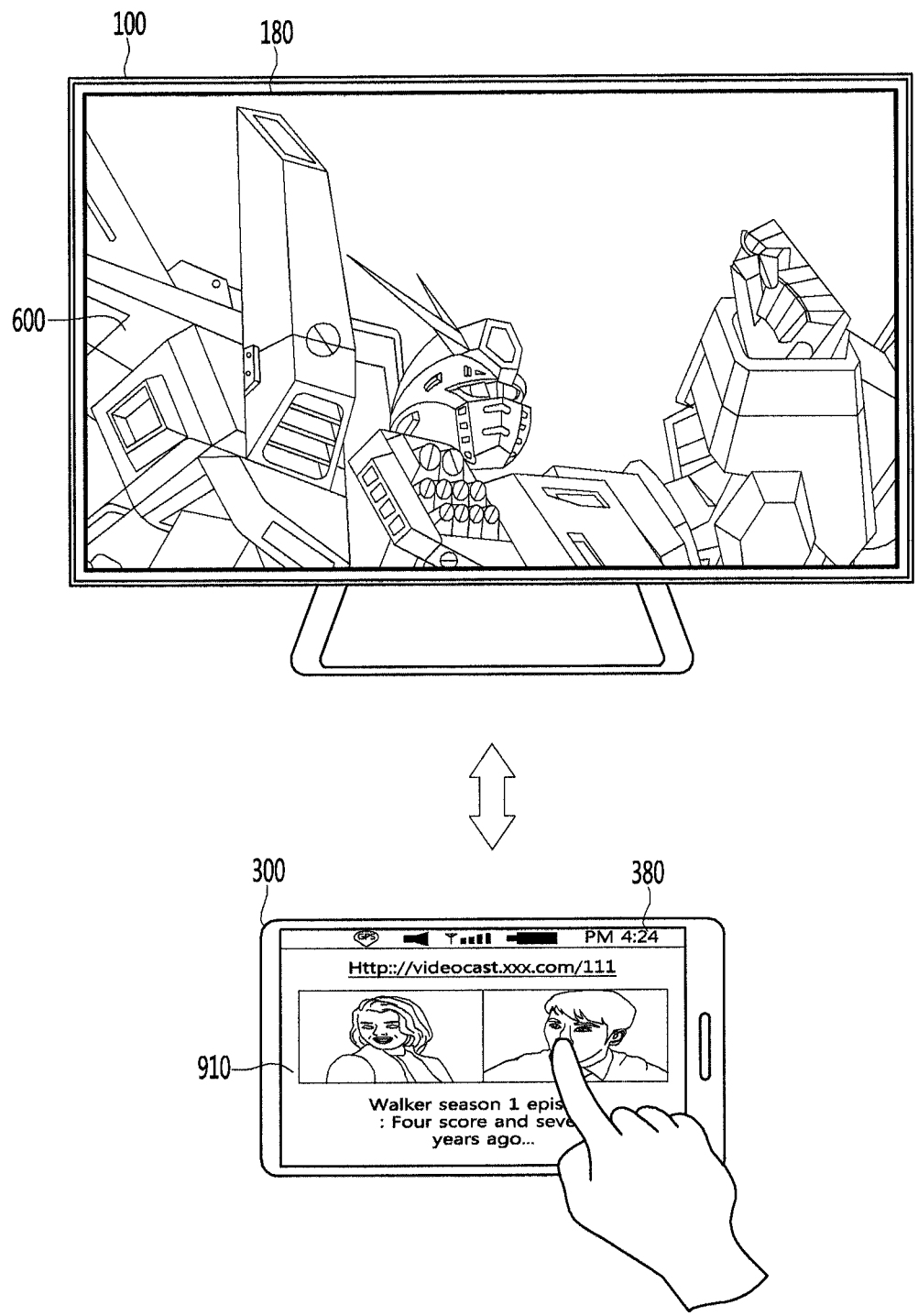
Figure 9C:
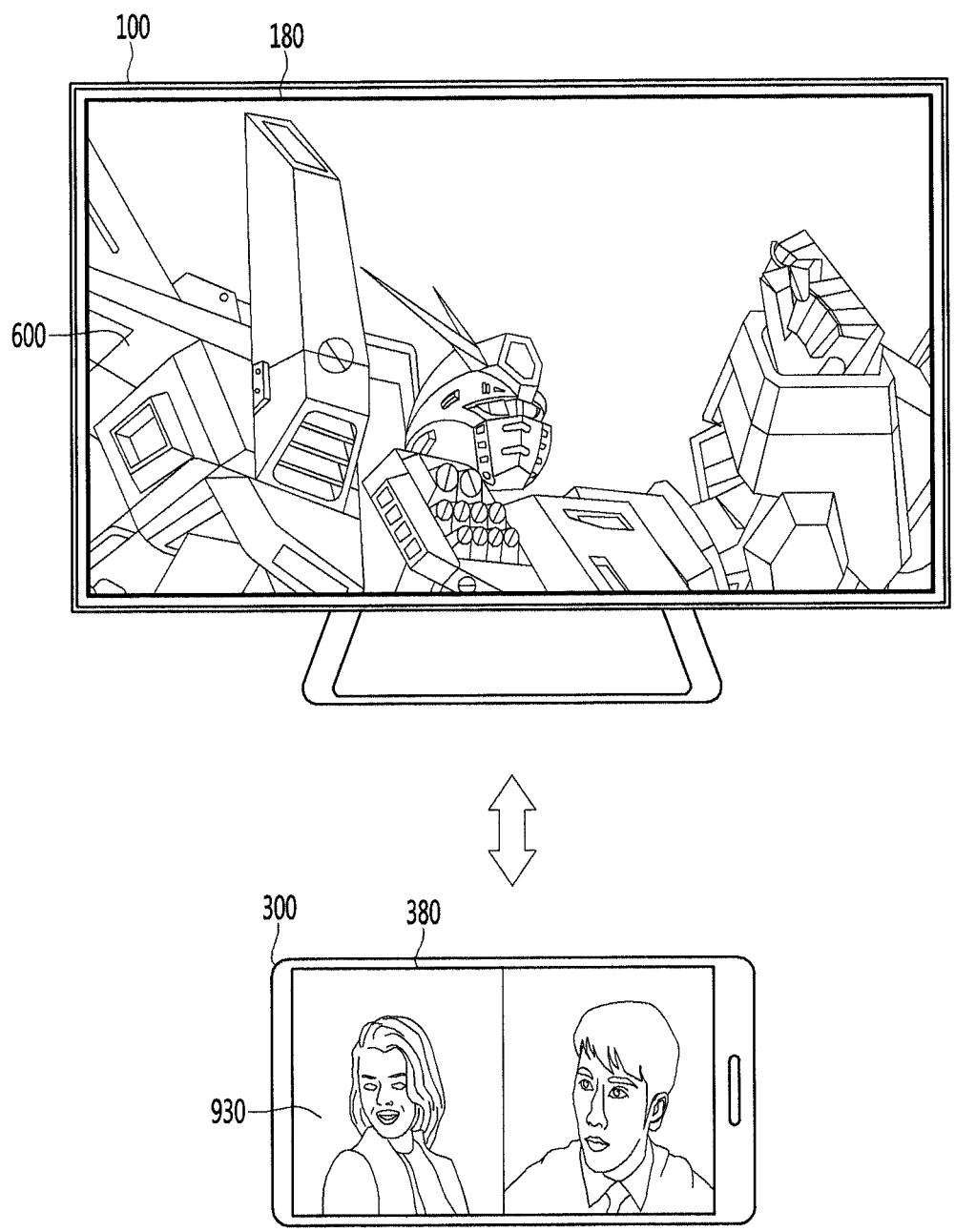

FIGS. 9A to 9C are views of providing information on a notification as a notification icon displayed on the screen of a mobile terminal is selected during the performance of a screen mirroring function according to an embodiment of the present invention.

During the performance of a screen mirroring function between the display device 100 and the mobile terminal 300, the mobile terminal 300 can receive a notification. Referring to FIG. 9A, each of the display device 100 and the mobile terminal 300 can display a notification icon 730 for representing that a notification is received, on a screen. That is, unlike FIG. 7A, the mobile terminal 300 can display a notification icon 730 instead of notification information 710.

If the notification icon 730 displayed through the display unit 380 of the mobile terminal 300 is selected, the mobile terminal 300, as show in FIG. 9B, can display detail information 910 of a notification corresponding to the selected notification icon 730, on the entire screen. That is, the mobile terminal 300 can switch the existing media content 600 in playback into detail information 910 of a notification. At this point, the display device 100 can display the existing media content 600 in playback as it is. For this, the mobile terminal 300 can continuously transmit the media content 600 to the display device 100. The detail information 910 of a notification can include the content information.

If content information included in the detail information 910 of a notification is selected, the mobile terminal 300, as shown in FIG. 9C, can display a content 930 corresponding to the selected content information on the entire screen through the display unit 380. At this point, the display device 100 can display the existing media content 600 in playback as it is. For this, the mobile terminal 300 can continuously transmit the media content 600 to the display device 100.

According to the embodiments of FIGS. 9A to 9C, even if a notification is received during screen mirroring, a user can check the notification received through the mobile terminal 300 without interfering with the viewing of a media content being played through the display device 100.

Figure 10A:
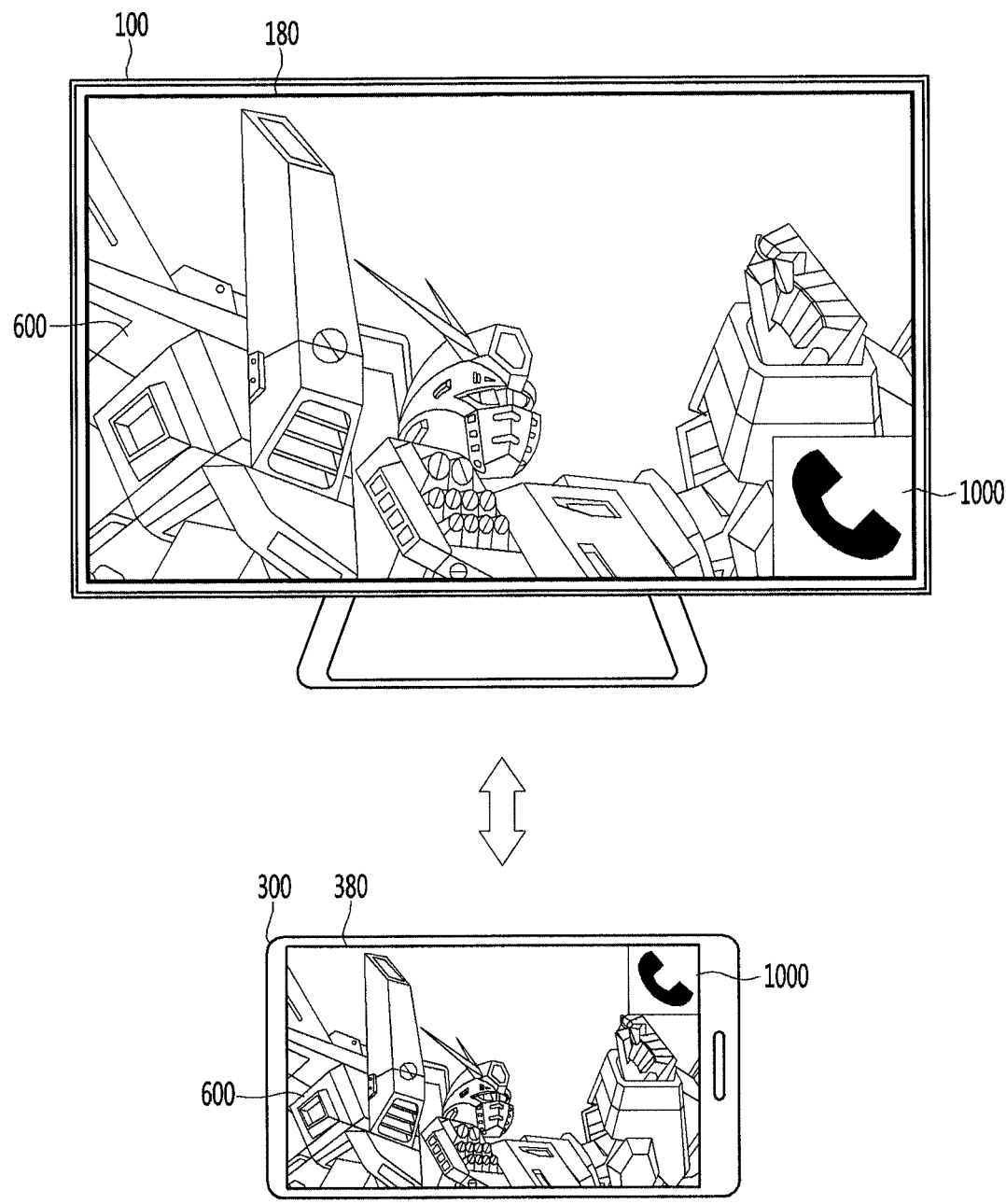
FIGS. 10A to 10C are views of providing information on a notification as a notification icon displayed on the screen of a mobile terminal is selected during the performance of a screen mirroring function according to another embodiment of the present invention.
Figure 10B:
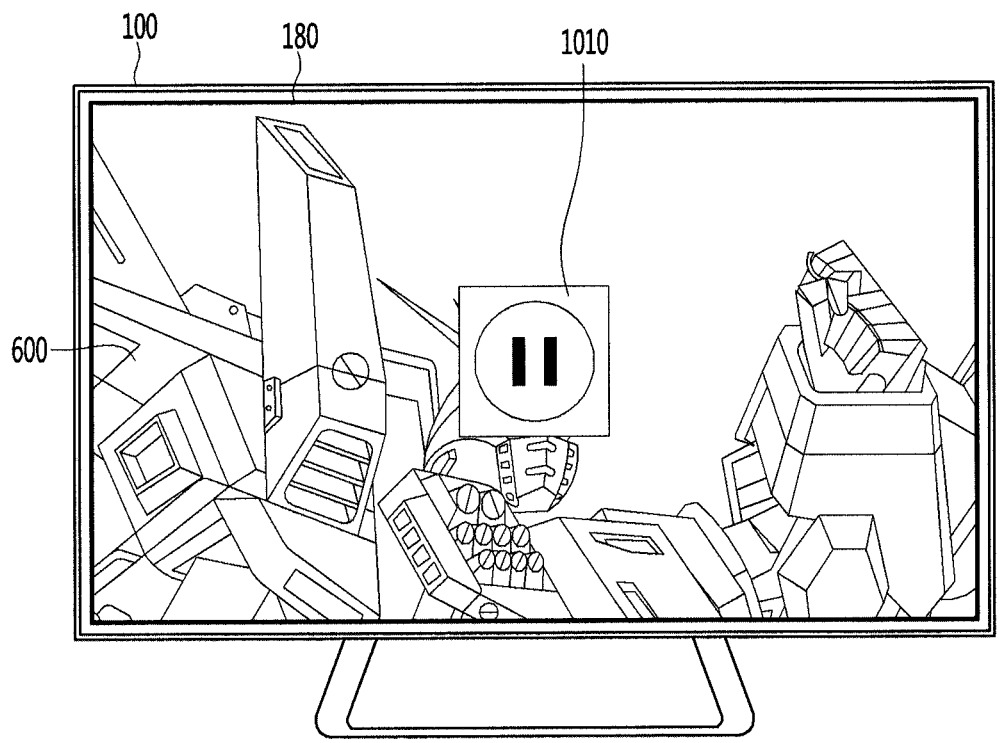
Figure 10B:
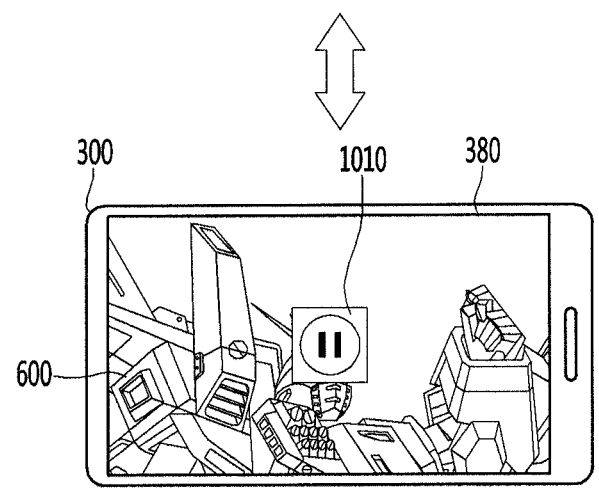
Figure 10C:
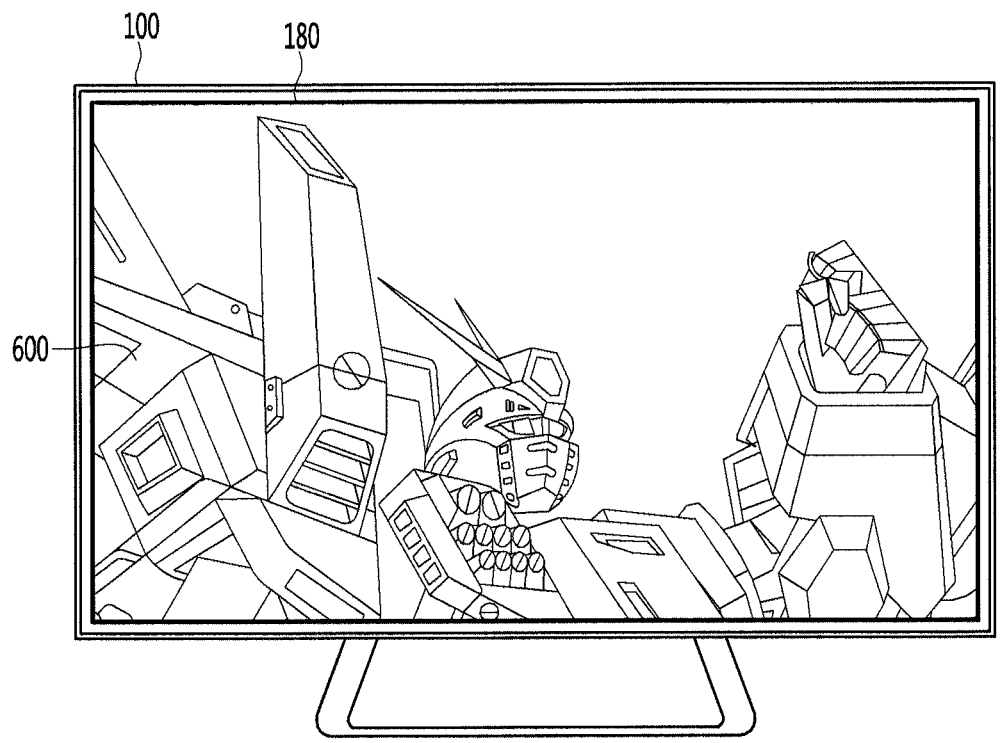
Figure 10C:
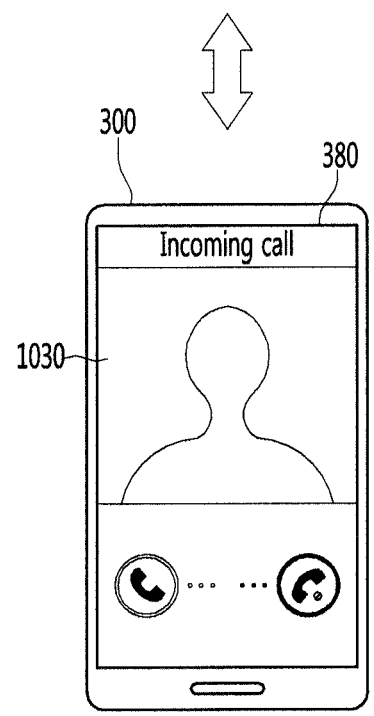

FIGS. 10A to 10C are views of providing information on a notification as a notification icon displayed on the screen of a mobile terminal is selected during the performance of a screen mirroring function according to another embodiment of the present invention.

Especially, it is assumed in FIGS. 10A to 10C that a notification is that a call is received.

Referring to FIG. 10A, during the performance of a screen mirroring function between the display device 100 and the mobile terminal 300, the mobile terminal 300 can receive a call signal. Each of the display device 100 and the mobile terminal 300 can display a call icon 1000 for representing that a call signal is received through a display unit. That is, each of the display device 100 and the mobile terminal 300 can display only the call icon 1000 without displaying a call reception screen.

If the call icon 1000 displayed through the display unit 180 of the display device 100 is selected, the control unit 170, as shown in FIG. 10B, can stop the playback of the media content 600 being played through a screen mirroring function. Additionally, as stopping the playback of the media content 600, the control unit 170 can display a stop icon 1010 for representing that the playback of the media content 600 is stopped. Additionally, after stopping the playback of the media content 600, the control unit 170 can output a voice signal corresponding to the call signal through the audio output unit 185. That is, a user selects the call icon 1000 displayed on the screen of the display device 100 to stop the playback of the media content 600 and performs a call with the other party through the display device 100. Moreover, if the call icon 1000 displayed through the display unit 180 of the display device 100 is selected, the mobile terminal 300 also can stop the playback of the media content 600 being played through the display unit 380 and display a stop icon 1010. However, this is just exemplary, and the mobile terminal 300 can display a call reception screen described later.

If the call icon 1000 displayed through the display unit 380 of the mobile terminal 300 is selected, the mobile terminal 300, as show in FIG. 10C, can display a call reception screen 1030 through the display unit 380. That is, as the call icon 1000 is selected, the mobile terminal 300 can switch the media content 600 to the call reception screen 1030. Then, a user can perform a call with the other party through the mobile terminal 300. That is, the mobile terminal 300 can not display an image of the media content 600 and can not output an audio of the media content 600.

Moreover, if the call icon 1000 displayed through the display unit 380 of the mobile terminal 300 is selected, the display device 100 can maintain the playback of the media content 600. For this, even if the call icon 1000 displayed on the display unit 380 is selected, the mobile terminal 300 can keep transmitting the media content 600 to the display device 100. The mobile terminal 300 can perform call connection while maintaining the transmission of the media content 600.

Again, FIG. 5 is described.

Moreover, if the display device 100 does not display media content through a screen mirroring function in operation S513, the control unit 170 displays a notification that the mobile terminal 300 receives in operation S537. According to an embodiment, a case that the display device 100 does not display media content can include a case that the home screen of the mobile terminal 300 is displayed through a screen mirroring function. This will be described with reference to the drawings.

Figure 11A:
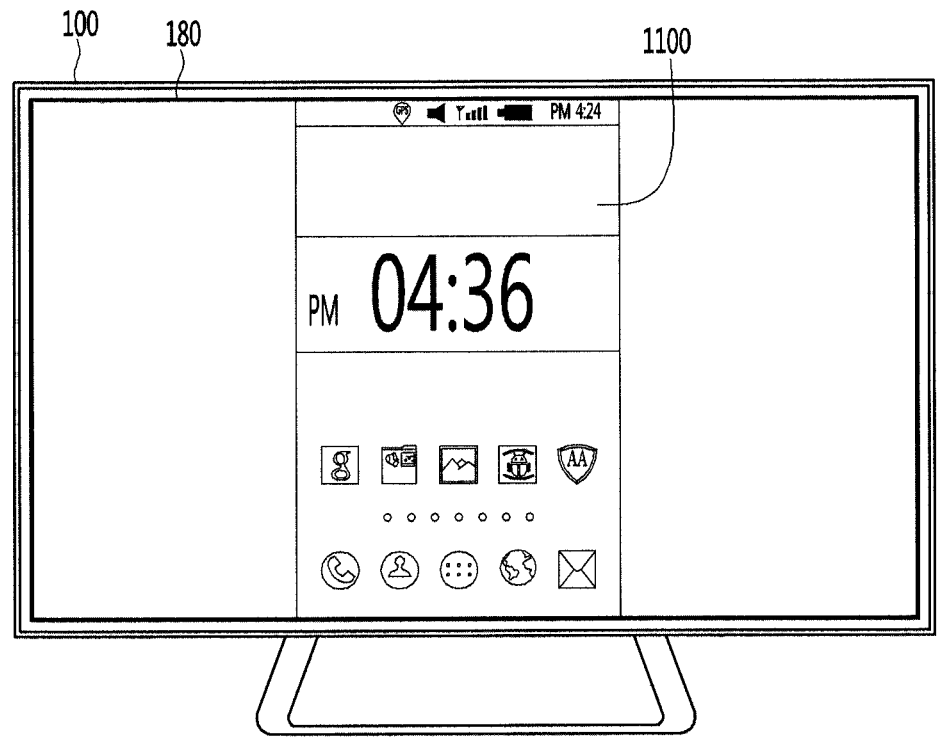
FIGS. 11A and 11B are views of processing a received notification if the notification is received in a state that a display device displays a home screen of a mobile terminal through a screen mirroring function according to an embodiment of the present invention.
Figure 11A:
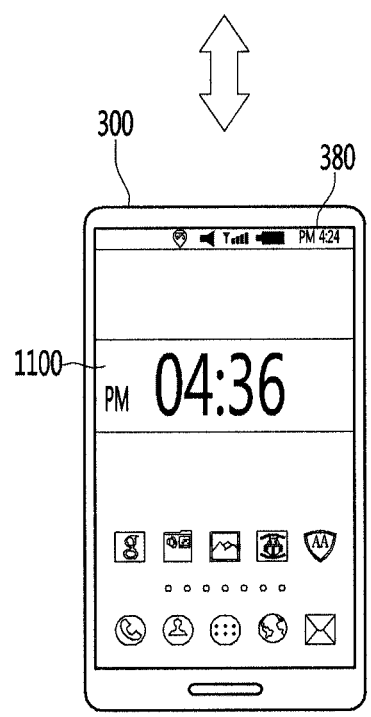
Figure 11B:
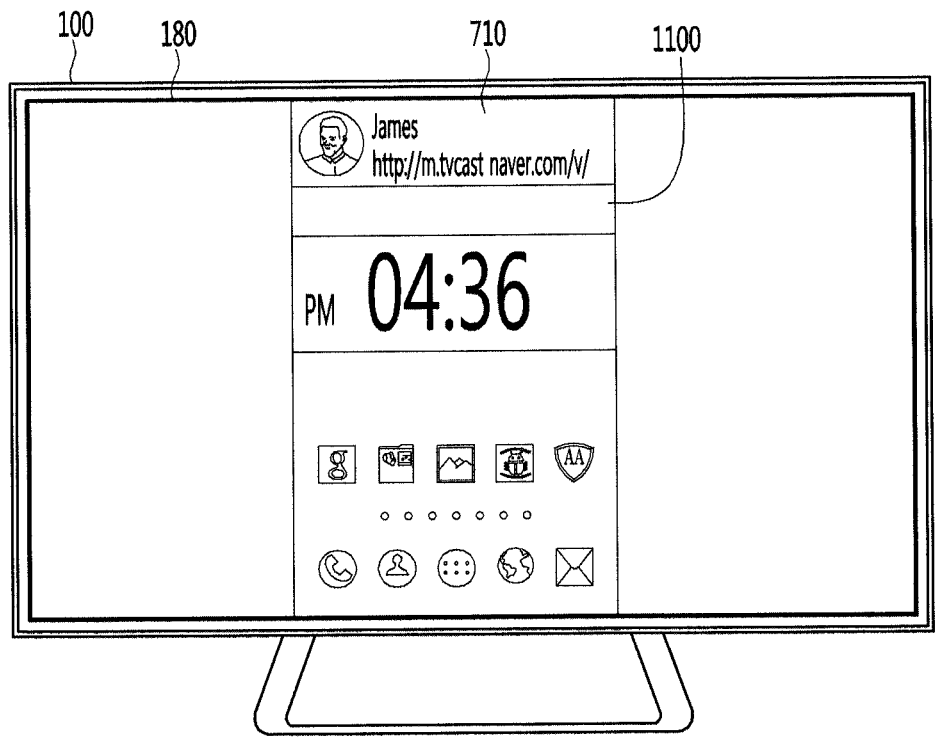
Figure 11B:
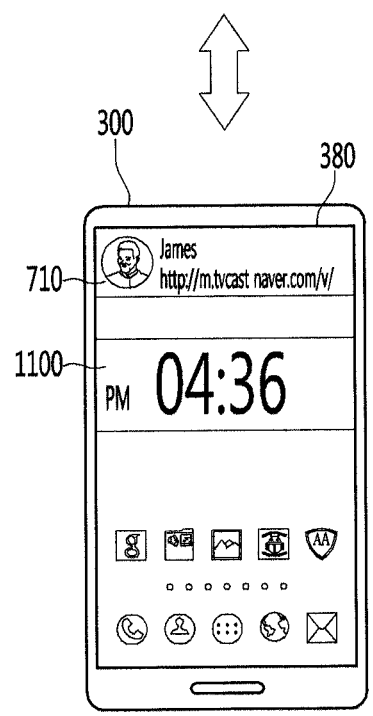

FIGS. 11A and 11B are views of processing a received notification if the notification is received in a state that a display device displays a home screen of a mobile terminal through a screen mirroring function according to an embodiment of the present invention.

Referring to FIG. 11A, the display device 100 currently performs a screen mirroring function with the mobile terminal 300 and a home screen 1100 being displayed by the mobile terminal 300 is displayed through the display unit 180.

In this state, the mobile terminal 300 can receive a notification. The mobile terminal 300 can display the received notification information 710 on the home screen. The display device 100 can check that media content is not currently played and display the notification information 710 through the display unit 180 identically to the mobile terminal 300.

Moreover, the mobile terminal 300 described in this present invention can include a display unit, a wireless communication unit, and a control unit. The display unit, the wireless communication unit, and the control unit in the mobile terminal 300 can respectively perform the functions of the display unit 180, the wireless communication unit 173, and the control unit 170 in the display device 10.

According various embodiments of the present invention, a user can not be disturbed in viewing media content as a mobile terminal receives a notification during the performance of a screen mirroring function between mobile terminals.

Additionally, a notification that a mobile terminal receives during the performance of a screen mirroring function between a display device and the mobile terminal can be easily used on the display device.

According to an embodiment of the present invention, the above-mentioned method can be embodied as computer readable codes on a non-transitory computer readable recording medium having a program thereon. Examples of the computer readable recording medium include ROM, RAM, CD-ROM, magnetic tape, floppy disk, and an optical data storage device and also include carrier waves (e.g., transmission through the Internet).

The above-described display device is not limited to the application of the configurations and methods of the above-described embodiments and the entire or part of the embodiments can be selectively combined and configured to allow various modifications.

What is claimed is:

1. A display device comprising:
a user interface configured to communicate with a remote controller;
a wireless communication circuit configured to communicate to perform a screen mirroring function with a mobile terminal;
a display unit configured to display a screen of the mobile terminal through the screen mirroring function; and
a controller configured to control the wireless communication circuit and the display unit,
wherein when the mobile terminal receives a notification and displays an overlapped brief information of the notification, while the display unit is displaying a media content being played by the mobile terminal, the controller displays on the display unit a notification icon for representing that the notification is received,
wherein the controller is further configured to:
display on the display unit a content information of the notification overlapping the media content being played by the mobile terminal when the notification icon displayed on the display unit is selected, and
display the media content on a first area of the display unit and a content corresponding to the content information on a second area of the display unit when the content information displayed on the display unit is selected.

2. The display device according to claim 1, wherein if an instruction for selecting the notification icon is received, detail information of the notification is displayed to be overlapped with the media content.

3. The display device according to claim 1, wherein the controller receives a first instruction for selecting content information included in detail information of the notification and displays a content corresponding to the content information on a screen of the display unit according to the received first instruction.

4. The display device according to claim 3, wherein the controller transmits a second instruction for displaying the content to the mobile terminal according to the first instruction.

5. The display device according to claim 3, wherein the controller does not receive the media content from the mobile terminal according to the first instruction.

6. The display device according to claim 1, wherein if the notification is a call from the other party, the controller stops the playback of the media content according to an instruction for selecting the notification icon; and the controller outputs an audio output a voice of the call through an audio output unit included in the display device.

7. The display device according to claim 1, wherein if the mobile terminal receives the notification, while displaying a home screen of the mobile terminal, the controller displays notification information corresponding to the notification.

8. An operating method of a display device, the method comprising:
receiving information on a screen being displayed by a mobile terminal through a screen mirroring function;
displaying a media content being played by the mobile terminal on the basis of the received information; and
when the mobile terminal receives a notification and displays an overlapped brief information of the notification, while the display unit is displaying the media content, displaying a notification icon on the display device for representing that the notification is received,
wherein the operating method further comprises:
displaying on the display device a content information of the notification overlapping the media content being played by the mobile terminal when the notification icon displayed on the display device is selected; and
displaying the media content on a first area of the display device and a content corresponding to the content information on a second area of the display device when the content information display on the display device is selected.

9. The method according to claim 8, wherein if an instruction for selecting the notification icon is received, detail information of the notification is displayed to be overlapped with the media content according to the received instruction.

10. The method according to claim 8, further comprising:
receiving a first instruction for selecting content information included in detail information of the notification; and
displaying a content corresponding to the content information on a screen of the display device according to the received first instruction.

11. The method according to claim 10, further comprising transmitting a second instruction for displaying the content to the mobile terminal according to the first instruction.

12. The method according to claim 8, further comprising not receiving the media content from the mobile terminal according to a first instruction.

13. The method according to claim 8, further comprising:
if the notification is a call from the other party, stopping the playback of the media content according to an instruction for selecting the notification icon; and
outputting a voice of the call.

14. The method according to claim 8, further comprising if the mobile terminal receives the notification, while displaying a home screen of the mobile terminal, displaying notification information corresponding to the notification.

\* \* \* \* \*